H. B. FABER.
METALLURGICAL AND CHEMICAL FILTER.
APPLICATION FILED APR. 3, 1915.
1,368,618.
Patented Feb. 15, 1921.
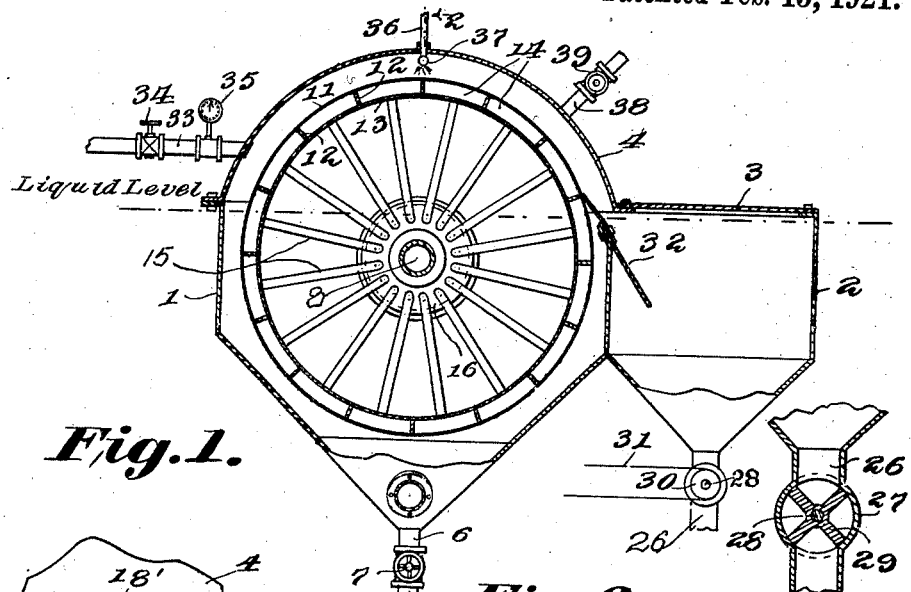
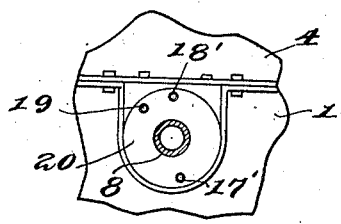
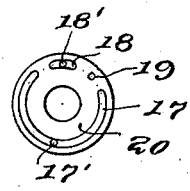
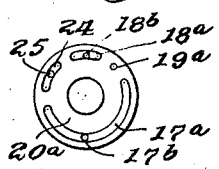
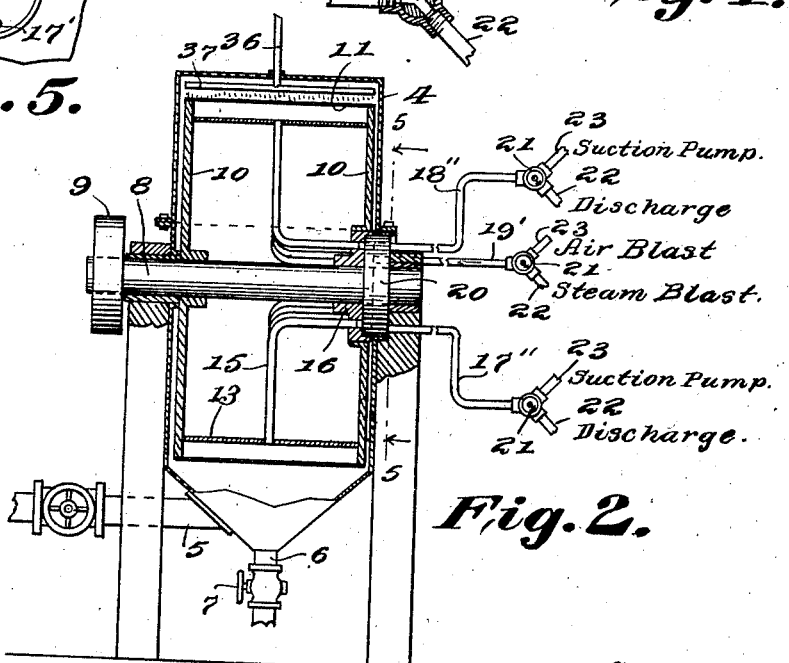
Witnesses
N. H. Lybrand
M. Delaney
Inventor
Henry B. Faber,
By Edgar M. Kitchin,
his Attorney.

UNITED STATES PATENT OFFICE.

HENRY B. FABER, OF NEW YORK, N. Y.

METALLURGICAL AND CHEMICAL FILTER.

1,368,618.    Specification of Letters Patent.    Patented Feb. 15, 1921.

Application filed April 3, 1915. Serial No. 18,957.

*To all whom it may concern:*

Be it known that I, HENRY B. FABER, a citizen of the United States, residing at New York, in the county of New York and State of New York, have invented certain new and useful Improvements in Metallurgical and Chemical Filters; and I do hereby declare the following to be a full, clear, and exact description of the invention, such as will enable others skilled in the art to which it appertains to make and use the same.

This invention relates to improvements in filtering apparatus, and more particularly to such as is especially adapted for use in the filtration of ore pulp and other pulp and chemicals.

One of the objects in view is the provision of an apparatus of the character mentioned adapted for operation incident to a difference in pressure at one side of filtering material from that at the other side thereof induced and maintained either by suction applied at the effluent side of the filtering material or pressure applied at the influx side of the filtering material or both.

A further object in view is the rendering of the continued operation of the apparatus effective by the degree of perfection attained in the cleansing of the filtering material in the continuous operation of the apparatus through the introduction of a reverse cleansing current under sufficient pressure to present a condition of unbalanced force relative to the pressure under which the filtering material is operating, whereby solids collected thereon and therein are removed therefrom.

With these and further objects in view, as will in part hereinafter be stated and in part become apparent, the invention comprises certain novel constructions, combinations and arrangements of parts as subsequently specified and claimed.

In the accompanying drawing,—

Figure 1 is a sectional elevation of an apparatus embodying the features of the present invention.

Fig. 2 is a similar view through the same, the section being taken on the plane indicated by line 2—2 of Fig. 1.

Fig. 3 is a detail elevation of the channeled disk of the valve.

Fig. 4 is an enlarged, detail, transverse-axial section through the air lock discharging apparatus for solids.

Fig. 5 is a sectional elevation taken on the plane indicated by line 5—5 of Fig. 2, and looking in the direction indicated by the arrow.

Fig. 6 is an enlarged, detail sectional elevation of one of the three-way valves.

Fig. 7 is a view similar to Fig. 3 of a slightly modified embodiment.

Referring to the drawing by numerals, 1 indicates a container for pulp or chemicals or other substances to be filtered communicating with which is the discharge tank 2, the latter being closed at its upper end by a detachable cover plate 3. The tank or container 1 is closed by a likewise detachable cap or cover 4, the cover 4 and cover plate 3 being preferably retained in position by bolts or other similar easily detached retaining means. A pulp supply pipe 5 communicates with container 1 at any appropriate point of intake, preferably below the liquid level of the container during operation. The container 1 is preferably formed with a hopper bottom and provided with a clean-out discharge pipe 6 at the apex of the hopper controlled by a valve 7.

Journaled in the container 1 is a filter sustaining shaft 8 the bearings of which are rendered non-leaking at the points of penetration of the container in any appropriate manner, as by ordinary packing glands, not shown in detail. The shaft is rotated, as by belting not shown, engaging a driving pulley 9. Fixed to the shaft 8 within the container 1 and cover 4 is the filter structure consisting of a rotor bearing filtering material divided to form distinct filter cells or compartments. The rotor may assume various forms and for the purpose of illustration is shown as having terminal disks or supports 10, 10, fixed centrally to the shaft 8. For the purpose of convenience of illustration, the continuous web form is shown. The filter cells or compartments are formed by a continuous filter fabric or other appropriate filter material 11 surrounding and fixed to the peripheral portions of the disks 10 and separated into sections by radially disposed division plates 12, 12, the inner edges of which are connected by an imperforate plate 13 or other appropriate closure. The plate 13 is preferably annular, as a matter of convenience in construction, for forming an imperforate base for each of the filter compartments 14 produced by any two of the division plates 12 with the respective portion of the filter material 11 stretched from one plate to the other and the corresponding portion of the inner or base plate 13.

The plate 13 is penetrated for each compartment or filter cell 14 by a tube 15 radiating from a valve disk 16 fixed to and rotating with the shaft 8. The passageway in the disk 16 for each tube or pipe 15 has at least a portion extending axially of the disk and opening at its outer face in position to successively register with the channel or groove 17, the channel or groove 18 and the port 19 in the coöperating disk 20 of the valve structure. The groove 17 communicates with an axially extending port 17' in the disk 20 and the groove 18 likewise communicates with port 18' in the disk 20, the ports 17', 18' and 19 respectively communicating with pipes 17'', 18'' and 19' for purposes hereinafter specified. Each pipe 17'', 18'' and 19' is provided with a three-way valve 21, seen in detail in Fig. 6, adapted to alternately establish communication between the respective pipe and a pair of branch pipes 22, 23. As clearly indicated in Fig. 2, by the legends opposite the respective branch pipes, the pipe 22 disposed to communicate with pipe 17'' is merely an open discharge directing the filtrate to any appropriate point of distribution, while the pipe 23 extends to a suction pump of any appropriate character adapted for the drawing of liquid from the material being filtered. The branch pipe 22, which is adapted to communicate with pipe 18'', is a similar discharge pipe, while the pipe 23 disposed to be brought into communication with pipe 18'' extends to a suction pump adapted to draw cleansing fluid through a coating of solids on the filtering material. The pipe 22 disposed to communicate with pipe 19' extends to a source of supply for steam under a head of pressure sufficiently in excess of the working pressure of container 1 for purposes of discharge of solids, as will be hereinafter pointed out, and the pipe 23 adapted to communicate with pipe 19' is connected with a source of supply of air under similar pressure.

While but two discharge pipes have been shown as connected with valve disk 20, and the communication of pipe 17'' has been indicated as continuous from the time a given filter cell or compartment enters the pulp to the time it is arriving at the point of cleansing, under some working conditions, it will be found that the air or other gas admitted through the filter material between the time a particular filter cell or compartment leaves the liquid level of the container 1 and the time of discontinuance of communication of the particular pipe 15 of such cell with port 17 will tend to destroy or at least reduce the effective sucking action of the pump communicating through the branch 23. To avoid this, it is only necessary to employ in lieu of the disk 20 a similar disk 20ª having a segmental groove 17ª communicating with port 17ᵇ and having segmental grooves 24 and 18ª provided, respectively, with ports 25 and 18ᵇ, the disk 20ª being also provided with a port 19ª. In the operation of the disk 20ª, as seen in Fig. 7, the grooves 17ª, 18ª and port 19ª function exactly as do the grooves 17 and 18 and port 19 of disk 20, except that communication to the suction pump for filtrate being discharged from the body of pulp in container 1 is cut off and the groove 24 establishes communication through port 25 with a separate suction pump so that influx of air or other gas between the point of the liquid level of pulp in container 1 and the point of cleansing cannot affect the action of the suction pump operating on submerged filter cells or compartments. The structure seen in Fig. 7 is thus obviously valuable, principally when the difference in pressure is being maintained by suction, since, when only the discharge pipe 22 is being employed and the delivery therethrough is being effected by difference in pressure occasioned by externally applied pressure, there can be no opportunity for varying the effective discharge of filtrate and such discharge will necessarily depend upon the force exerted on the surface of the pulp by the externally applied pressure incident to the resistance against influx of pressure agent through the coating of solids on the non-submerged cells.

The discharge container 2 for the solids is formed with a hopper bottom terminating in the discharge pipe 26, formed with an intermediate cylindrical portion 27, in the end walls of which is journaled a shaft 28 carrying a discharge wheel 29 consisting of radiating blades disposed to act as air locks for receiving solids from the upper portion of discharge pipe 26 between each two of the successive blades, and, by the revolution of the wheel 29, to direct such solids down into and through the lower portion of the discharge pipe 26 without breaking the pressure within the discharge container 2. Shaft 28 may be driven in any appropriate manner as by pulley 30 engaged by an actuating belt 31. Fixed to the partition plate between containers 1 and 2 or otherwise appropriately sustained, is a directing shield for solids which may be considered a scraper since its upper edge extends sufficiently contiguous to the periphery of the filtering rotor to receive solids discharged therefrom, but the instrument 32 is not a scraper in the true sense, since it does not contact with the filtering surface and, therefore, does not actually scrape substance therefrom.

Communicating with the container 1 is a supply pipe 33 for a pressure vehicle such as air under pressure. The point of location of the point of communication of the pipe 33 with container 1 is not material, though preferably above the liquid level, and as a matter of convenience, it is desirable to have the pipe 33 communicate through the hood or cover 4. Pipe 33 is valved at 34 for controlling the admission of pressure vehicle, and a gage 35 communicates with pipe 33 between the valve and container for indicating the degree of pressure within the container.

A water or other cleansing fluid supply pipe 36 communicates through the hood 4 to the interior of the container, preferably at the highest point thereof. The inner end of pipe 36 communicates with and supports a sprinkler header 37, and while pipe 36 is indicated as supported by the hood 4, it is preferably additionally supported by means not illustrated so as to be sustained in place when the hood 4 is removed.

For enabling employment of the apparatus by suction under atmospheric pressure, a pipe 38 is arranged to communicate through hood 4 with container 1, and is valved at 39 so that by closing the valve 34 and opening the valve 39, the whole apparatus will be changed from a "pressure" to a "suction" filter, the former term referring to difference in pressure at the opposite faces of the filter fabric maintained by pressure applied at the exterior or influx face of the filter material, and the latter term referring to difference in pressure at the opposite faces of the filter material induced and maintained by suction applied at the effluent surface of the filter material.

When the apparatus is to be employed simply as a pressure filter, the valves 21 of pipes 17″ and 18″ are turned to the position indicated in Fig. 6, pulp is supplied through pipe 5 until a liquid level approximately that indicated in Fig. 1 of the drawing is established, pressure vehicle is admitted through pipe 33 and wash water or other cleansing fluid through pipe 36, the supply of wash water being, of course, under a head sufficiently in excess of the pressure through pipe 33 to enable sprinkling of the water from the header 37. The valve 39 is, of course, closed. The rotor is revolved and the submerged filter sections or cells 14 receive filtrate forced thereinto by the pressure on the surface of the pulp and such filtrate is discharged through the pipes 15, groove 17ª, and port 17ᵇ, to pipe 17″ and pipe 22. If difficulty is experienced in starting the apparatus, owing to the free exhaust of pressure vehicle through the non-submerged filter cells, the difficulty may be overcome by delivering a charge of pulp through pipe 36 until a coating is formed on the non-submerged cells which communicate with groove 17, and then the apparatus will continue to operate effectively in a building up of cakes of solids from the pulp on the filter material of the cells submerged. Such a difficulty as this, of course, could not be experienced when the structure is arranged with connections as indicated in Fig. 7, since the communicating pipe for port 25 could be closed by its valve. Whichever structure is employed, of course, it is desirable in starting the apparatus to close the valve 21 of port 18′ and prevent free escape of pressure vehicle through the non-submerged filter cells communicating with pipe 18″. After the apparatus has been effectively started, its operation is continuous. The cakes built on the filter material of the respective cells are successively brought under the spray 37 and are washed thereby, the cleansing fluid passing through the cakes being discharged through pipe 18″ and then as the cake for each filter cell approaches the shield 32 (known in the art as a doctor), the solids are blown sufficiently to be lifted slightly from the filter surface so as to slide tangentially and easily over on to the shield 32 usually in the form of a substantially continuous web of solids. The cleansing blast delivered in the reverse direction is supplied through port 19 from either a source of compressed air or from a source of steam. In the handling of certain substances, it will be desirable to maintain substantially uniform pressure within the container 1, and in such instances, steam will be employed for the reason that while the steam must be supplied under pressure sufficiently in excess of the contained pressure of tank 1 to act as an unbalanced force against such contained pressure so as to effect the discharge of the cake, still the cooling and condensing of the steam will allow the pressure thereof to quickly drop after discharge through the filtering material down to the contained pressure, so that practically no vibratory action results. In the handling of other substances, it is desirable to effect the pulsating or vibrating action, and for this reason air under pressure may be supplied through branch pipe 23 of pipe 19′ and this pressure vehicle, on entering the container, will not drop suddenly to the contained pressure, but must distribute itself throughout those portions of the container not occupied by liquid, and in doing so will add itself to the volume of the pressure vehicle already present in the container, with the result that a throbbing of vibratory movement will occur at the points of influx of the air under excess pressure. It will, of course, be clear that instead of providing an independent source of supply for pressure vehicle through pipe 33, the entire apparatus may be operated as a pressure filter through pressure vehicle admitted through pipe 19′ and first employed for discharging solids and thereafter employed for acting as the pressure medium effecting the discharge of filtrates. To accomplish this operation, it is only necessary to close valve 34 and to supply the pressure medium through port 19 in sufficient quantities and under the requisite head for attaining the result desired.

After the solids have been delivered to tank 2, they are received and discharged as in the form of successive masses in the course of rotation of wheel 29.

When it is found desirable to employ the structure as a suction filter, either the valve 34 may be closed and valve 39 opened, or if preferred, the bolts or other detachable securing means for hood 4 and cover plate 3 may be removed and the hood and cover plate entirely disconnected from the respective containers. Of course, the pipe 36 is left or replaced in its operative relation to the rotor. The valves 21 of pipes 17'' and 18'' are turned from branches 22 to branches 23. The operation then will be otherwise the same as above described.

In addition to these two methods of operating the apparatus, a further and sometimes very desirable method of operation will consist in arranging the valves 21 of pipes 17'' and 18'' to establish communication with branches 23, while the cover plate 3 and hook 4 are in position and while the valve 39 is closed and valve 34 opened. When the parts have been so disposed, the operation will continue as above described, except that an accentuated difference in pressure will be provided at the respective faces of the filter material because suction is being applied at one face while direct pressure is being applied at the other. It will be noted that in the operation of the structure under these conditions, the pressure supplied through pipe 19' will only need to be sufficiently in excess of the pressure supplied through pipe 33 to represent an unbalanced force relative thereto as each filter cell receiving a cleansing or reverse blast through pipe 19', being in communication with port 19, and out of communication with any other port in the controlling valve, will not be subject to the action of the suction pump. The reverse or cleansing blast through pipe 19' may be water or other cleansing fluid but is preferably either steam or compressed air as indicated.

The desirability of effecting filtration through difference in pressure at the opposing sides of the filtering material by the exerting of pressure ranging inward from the outer face of the fabric, as distinguished from suction, will be manifest as existing under various conditions as, for example, when hot pulp is being treated, whose vapors would destroy the partial vacuum effected by suction, or as, for a further example, when a highly volatile or a fuming chemical is being treated.

What I claim is:

1. In filtering apparatus, the combination with an air-tight container, of a rotary filter therein divided into filter sections, an independent discharge pipe for each section, pressure medium supply means for the container, a distributing valve communicating with said discharge pipes, means for supplying cleansing fluid to solids collected on the filter, the distributing valve being provided with means for directing the discharge of filtrates received through the discharge pipes prior to the application of the cleansing fluid to one point of distribution and that received subsequent thereto to another point of distribution, and means for removing the cleansed solids from the filter.

2. In filtering apparatus, the combination with an air-tight container, of a continuously operated filter therein, means for supplying pressure medium to the container for effecting penetration of the filter by the filtrate incident to difference in pressure maintained at the exterior of the filter from that at the interior thereof, and means for providing a counter-pressure in excess of said pressure medium to lift substantially all solids from successive portions of the filter during the course of continued operation thereof without relieving the pressure on the filtering portions of the filter.

In testimony whereof I affix my signature in presence of two witnesses.

HENRY B. FABER.

Witnesses:
  G. D. VERUACI,
  JOHN R. FICKE.